US005558368A

United States Patent [19]
Cerny et al.

[11] Patent Number: 5,558,368
[45] Date of Patent: Sep. 24, 1996

[54] CHASSIS STRUCTURE

[75] Inventors: John R. Cerny; Mohamad S. El-Zein, both of Bettendorf, Iowa; Richard A. Curry; Maurice A. Popelier, both of Moline, Ill.; Harold E. Krause, Milan, Ill.

[73] Assignee: Deere & Company, Moline, Ill.

[21] Appl. No.: 333,923

[22] Filed: Nov. 3, 1994

[51] Int. Cl.$^6$ ........................................... B62D 21/00
[52] U.S. Cl. ........................... 280/781; 296/189; 296/203
[58] Field of Search ........................................ 296/189, 193, 296/203, 901; 446/470; 280/781, 785

[56] References Cited

U.S. PATENT DOCUMENTS

| | | |
|---|---|---|
| D. 311,921 | 11/1990 | Popelier et al. . |
| D. 338,473 | 8/1993 | Patterson et al. . |
| 2,814,524 | 11/1957 | Porsche et al. ........................ 296/193 |
| 3,595,335 | 7/1971 | Wessells, III ........................... 296/189 |
| 4,684,151 | 8/1987 | Drewek .................................. 296/189 |
| 5,020,846 | 6/1991 | Bonnett . |
| 5,171,055 | 12/1992 | Hutchison et al. . |
| 5,174,627 | 12/1992 | Clearman et al. . |
| 5,238,267 | 8/1993 | Hutchison et al. . |
| 5,314,230 | 5/1994 | Hutchison et al. . |

FOREIGN PATENT DOCUMENTS 1405866   1/1969   Germany ............................... 296/189

OTHER PUBLICATIONS

Vicki P. McConnell, *Advanced Composites*, "In the Fast Track–Composites in Race Cars", 8 pages, Mar.–Apr. 1991, Published in the U.S.A..

Stuart Birch, *Automotive Engineering Magazine*, "Global Viewpoints", 2 pages, Jan. 1990, published in the U.S.A..

Deere & Co., drawings, 2 pages, 18 Mar. 1987, published in the U.S.A..

Deere & Co., John Deere Telerobotics, 1 page, dated prior to 1990, published in the U.S.A..

General Electric Co., "Systems for Automated Manufacture", 8 pages, date unknown, published in the U.S.A..

Carron & Company, Inkster, Michigan article entitled "All–Plastic Concept Car", 3 pages, July 1987, published in the U.S.A..

Stratime Capello Systemes letter to Deere & Company, 10 pages, Nov. 1989, published in the U.S.A..

The Dow Chemical Co. and Deere & Company, "Preliminary Feasibility Study", containing information generated and produced by employees of the Dow Chemical Co. and Deere & Co., pp. No. 1–205, including four sublettered pages, co–generated prior to 1 Sep. 89 and confidentially shared between The Dow Chemical Co. and Deere & Co., published in the U.S.A..

The Dow Chemical Co., "If Man Were Meant To Fly, God Would Have Given Him Wings, You'll Never See A Computer Small Enough To Fit On A Desk, Steel Is For Cars, Aluminum Is For Airplanes, Plastic Is For Toys", 12 pages, dated Apr. 1989, published in the U.S.A..

Primary Examiner—Paul N. Dickson

[57] ABSTRACT

A fiber reinforced plastic composite chassis incorporates flexible panel suspension structure between generally rigid chassis members, to accommodate, dissipate and absorb bending and torsional loads encountered by the chassis.

103 Claims, 10 Drawing Sheets

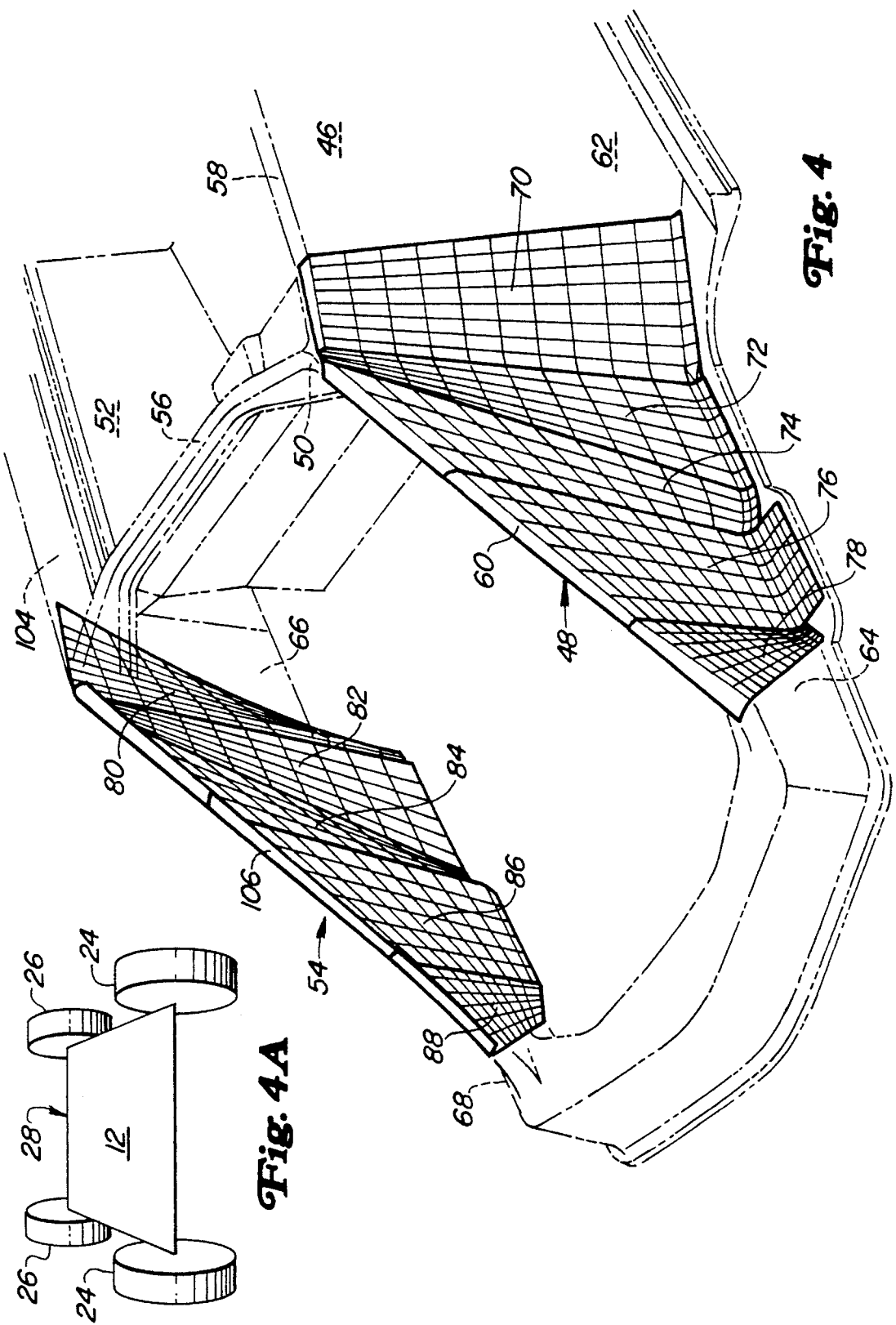

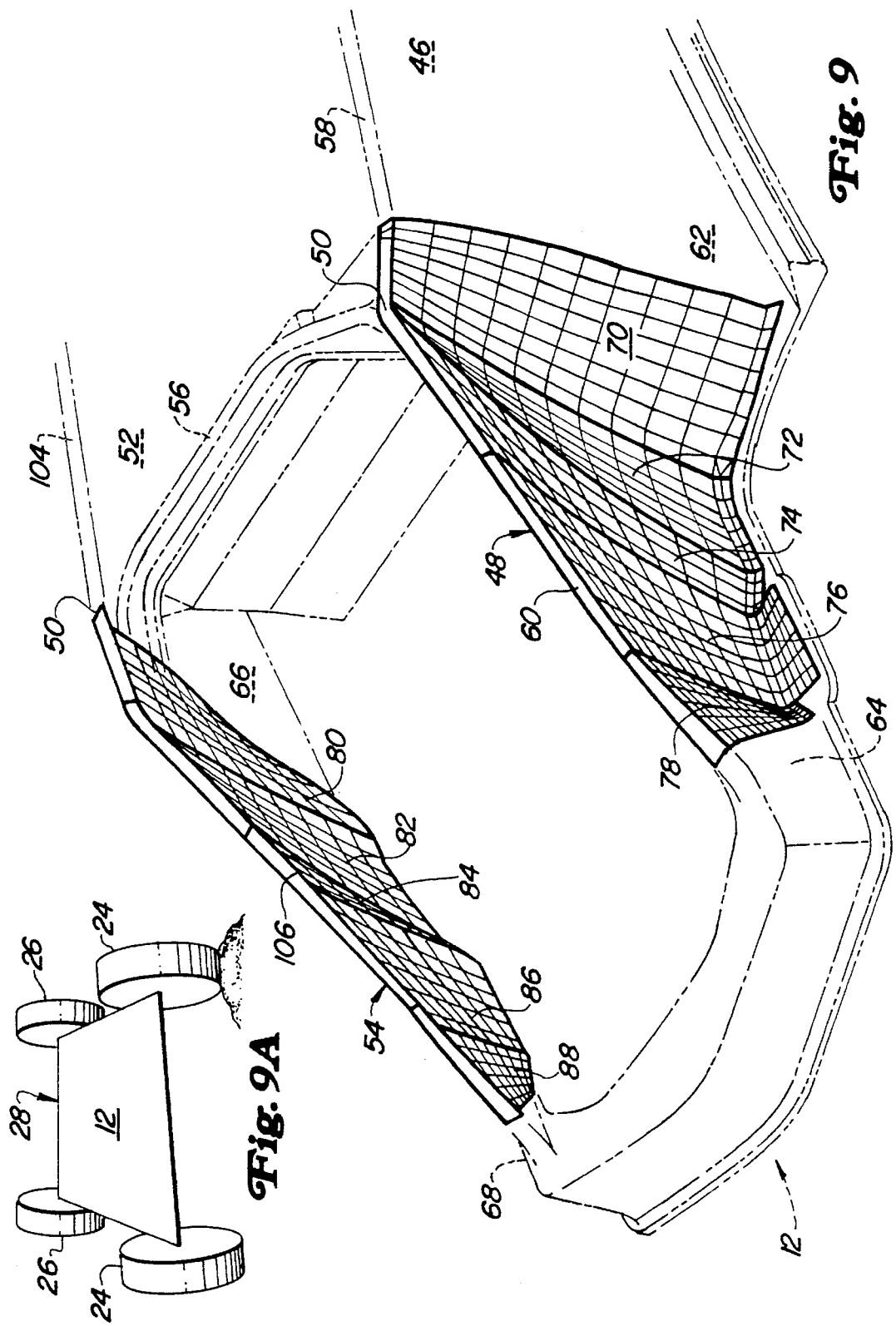

5,558,368

CHASSIS STRUCTURE

BACKGROUND OF INVENTION

1. Field of Invention

The present invention relates to land transportation vehicles and particularly to a fiber reinforced plastic composite vehicle chassis. More specifically, it relates to a one piece vehicle chassis that has particular usefulness in smaller vehicles such as lawn and garden tractors, golf carts and utility vehicles.

2. Description of the Related Art

Reinforced polymer composites have been utilized in vehicles for some time. They have been used for auto shells which have been fastened to metal frame structures, for undercarriage parts fastened to metal frames and for body panels fastened to metal frames. Each of these applications depended upon the metal frames to resist torsional and bending loads encountered by the vehicles.

Recently, fiberglass reinforced plastic composites have been used to produce a vehicle assembly which did not require the use of metal frame members. Utilized in that application were thermoplastic composites, which facilitated the use of injection molding processes and therefore permitted the use of mass production applications for this chassis. As a result of using thermoplastic materials, which are less resistant to fatigue and creep than thermoset polymers, the vehicle chassis was composed of three separate parts, that when assembled formed hollow compartments. The walls of these compartments then provided the frame-like strength necessary to withstand the concentrated torsional and bending loads previously resisted by metal frame members. This assembly not only required three members, but depended upon them being satisfactorily bonded together to assure integrity of the compartments that resisted the torsional and bending loads.

While frame-like sturdiness and rigidity has been achieved in plastic chassis through use of the three part monocoque structure mentioned above, it would be desirable to provide a single piece plastic vehicle chassis that could resist torsional and bending forces while providing those frame-like characteristics.

It would also be desirable to provide a reinforced plastic composite chassis capable of supporting an engine, an operator, drive and steering wheels, and steering system, and which would be capable of flexing throughout its length and width to absorb torsional and bending loads encountered during operation.

Additionally, it would be desirable to provide a single piece composite chassis which could resist such loadings and also serve as a suspension stem to accommodate ground irregularities and variations. With such a chassis, there would be no need to rely upon bonded joints for resisting bending and torsional loadings. Further, it would be desirable to provide a suspension system which could be used to support a portion of the chassis, such as an operator station on the chassis base.

It would also be desirable to provide a single piece chassis that could be mass-produced not only by injection molding techniques but by compression molding, liquid composite molding techniques or by hand lay-up. Additionally, it would be desirable to be able to produce the single part plastic chassis with thermoplastic or thermoset polymers that would make available the broadest design capabilities and greater opportunity for cost effectiveness.

SUMMARY OF THE INVENTION

Towards this end, there is provided a single piece fiberglass reinforced plastic composite chassis capable of supporting an operator, an engine and associated vehicle components. The chassis structure incorporates suspension components that permits it to absorb and accommodate bending and torsional loadings, under both static and dynamic conditions. The chassis, while bonded to a second member that provides the vehicle body or shell, does not rely upon the bonded joints to maintain its ability to resist bending and torsional forces. Further, the chassis can be produced with thermoplastic or thermopolymer composite materials utilizing a variety of reinforcing elements such as glass, aramid or carbon. Finally, the chassis can be manufactured through a variety of mass production techniques such as compression molding, injection molding, liquid composite molding processes or by hand lay-up.

BRIEF DESCRIPTION OF THE DRAWINGS

FIG. 4 is a upper rear perspective view of the chassis section shown in FIG. 3.

FIG. 4a is intended to schematically illustrate the unloaded state of the chassis of FIG. 4.

FIG. 9 is a rear partial perspective view of the chassis shown in FIG. 8, but depicting the condition of the flexible panels as the right rear wheel raises to pass over an obstacle.

FIG. 9a illustrates schematically the condition of the chassis as the right rear wheel raises to pass over an obstacle.

DESCRIPTION OF THE PREFERRED EMBODIMENT

Figure 1:
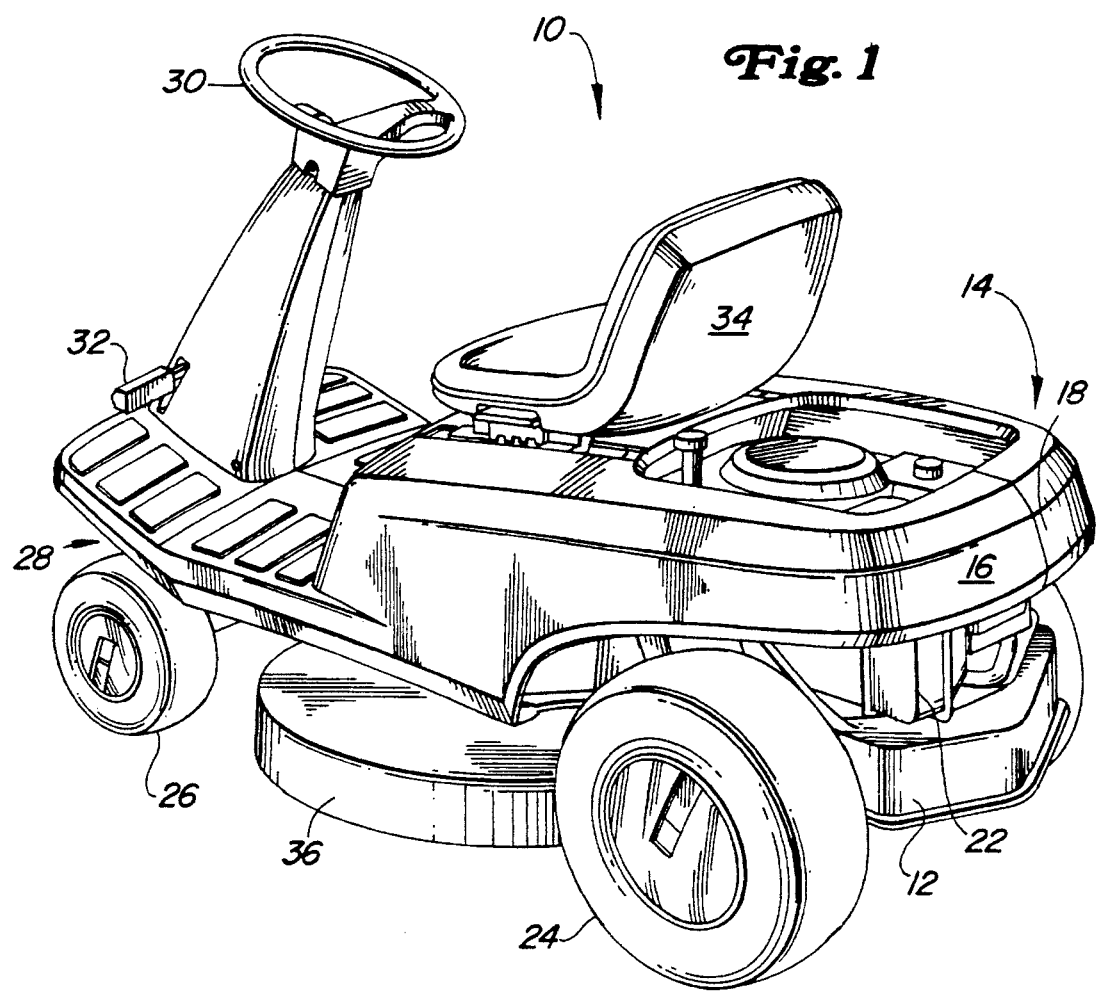
FIG. 1 is a rear elevational perspective view of a vehicle assembly that can utilize the composite chassis subject of the present invention.

Looking now to FIG. 1 there is illustrated a lawn and garden vehicle 10 of the type that could utilize the chassis structure which is subject to the present invention. The vehicle 10 includes a chassis structure 12 to which an upper body shell 14 is attached, preferably by bonding. The shell 14 is composed of left and right halves 16 and 18 which are bonded together as well. At the rear of the chassis structure 12 and in an opening 20 provided therein, (see FIG. 2) an engine-transaxle combination 22 is mounted. Beneath the bottom of the chassis 12 are carried wheel supporting structures (hidden) for rear drive and front steerable wheels 24 and 26. Near the front portion 28 of the vehicle and chassis 12 is carried the steering wheel 30, clutch 32 and brake (not shown) peddle. An operator's seat 34 is mounted on the upper portion of the chassis 12 with a grass mowing deck 36 suspended beneath the chassis 12.

Figure 2:
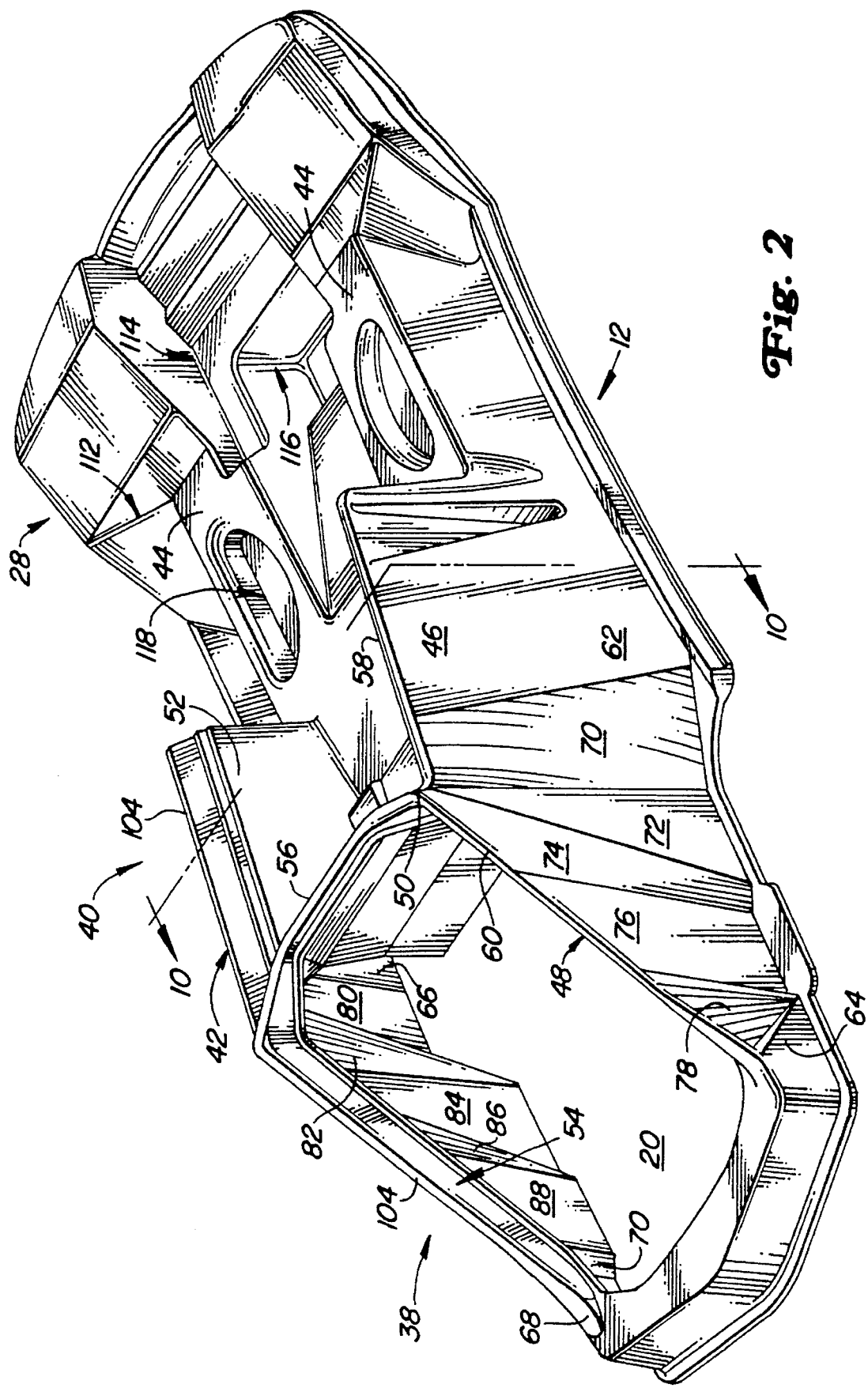
FIG. 2 is a rear elevational perspective view of the fiberglass reinforced composite chassis.

Looking now to FIG. 2, there is illustrated in rear elevated perspective view, the chassis structure 12 which is subject of the present invention. The chassis 12 includes at its rearward portion 38, the opening 20 wherein the engine and transaxle combination 22 can be carried. In its mid-portion 40 is provided a support structure 42 upon which the operator's seat 34 can be carried. At the forward portion 28 of the chassis 12 are provided a platform 44 adapted to support a foot rest structure for the operator.

Figure 10:
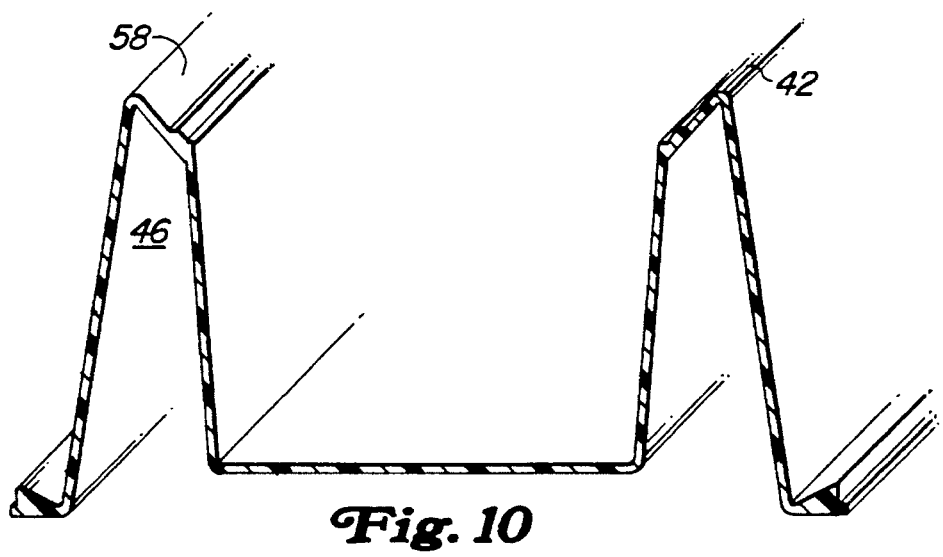
FIG. 10 is a view taken along 10—10 of FIG. 2, illustrating in cut-away perspective, the "V" shaped configuration of the seat support area.

The forward portion 28 of the chassis 12 is essentially rigid and is coupled on its right or near side as seen in FIG. 2, to a first inverted "V" shaped generally rigid member 46 formed in the chassis 12 at its mid-portion 40 (see also FIG. 10). This member 46, in turn, is connected by flexible members to a second generally rigid member 48 formed in the rear section 38. The second rigid member 48 joins the first rigid member 46 at 50 and extends therefrom downwardly along the engine opening 20 to the rear bumper area of the chassis 12. At the left side of the chassis 12, as viewed from the operator's position, the front portion 28 connects to a third generally rigid inverted "V" shaped member 52 that is also connected by one or more flexible members to a fourth generally rigid member 54 at the rear portion 38 of the chassis 12. Extending across the chassis 12 at the front of the engine opening 20 and interconnecting the generally or semi-rigid members 46,48 and 52,54 on each side of the chassis is a fifth generally rigid member 56.

Unless otherwise noted, only the right side of the chassis 12, its semi-rigid members 46 and 48 and their interconnecting flexible members will be discussed in detail since the two sides of the vehicle 10 have essentially mirror image but identical structures.

As seen in FIG. 2, the first semi-rigid member 46 includes a rolled over edge or rib 58 at its top portion that extends fore-and-aft and is joined with the forward end of a similar edge or rib 60 carried at the top of the second rigid member 48. These edges or ribs 58, 60 each extend downwardly to provide an inverted "V" shape which serves to provide strength and rigidity. The first and second rigid members 46–48 respectively extend forwardly and rearwardly from the common joint 50.

In the preferred embodiment, the flexible means provided between the generally rigid members 46,48 and 52,54 on each side of the chassis includes five flexible members or panels. While five separate or distinct panels are preferred, a single panel with the desired configuration to accommodate bending and twisting could conceivably be used in place of the five separate panels. Similarly, providing a radiused transition between adjacent panels instead of distinct panel junctures would be possible. The five panels on each side of the chassis serve as first and second suspension means to interconnect the spaced apart portions 62 and 64 of the first and second semi-rigid members 46,48 and the spaced apart portions 66–68 of the third and fourth semi-rigid members 52–54. The flexible panels on the right side are numbered 70, 72, 74, 76 and 78 while those on the left side are numbered 80, 82, 84, 86 and 88. To better understand how these members flex when torsional and bending loads are encountered by the chassis 12, the drawings numbered 3, 4, 8 and 9 utilize wire frame depictions of the flexible panels.

Figure 3A:
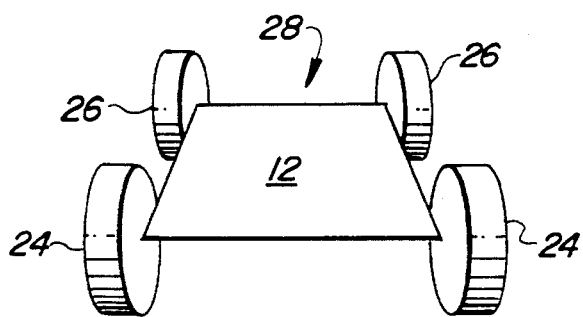
FIG. 3a is intended to schematically illustrate the chassis in an unloaded state.
Figure 3:
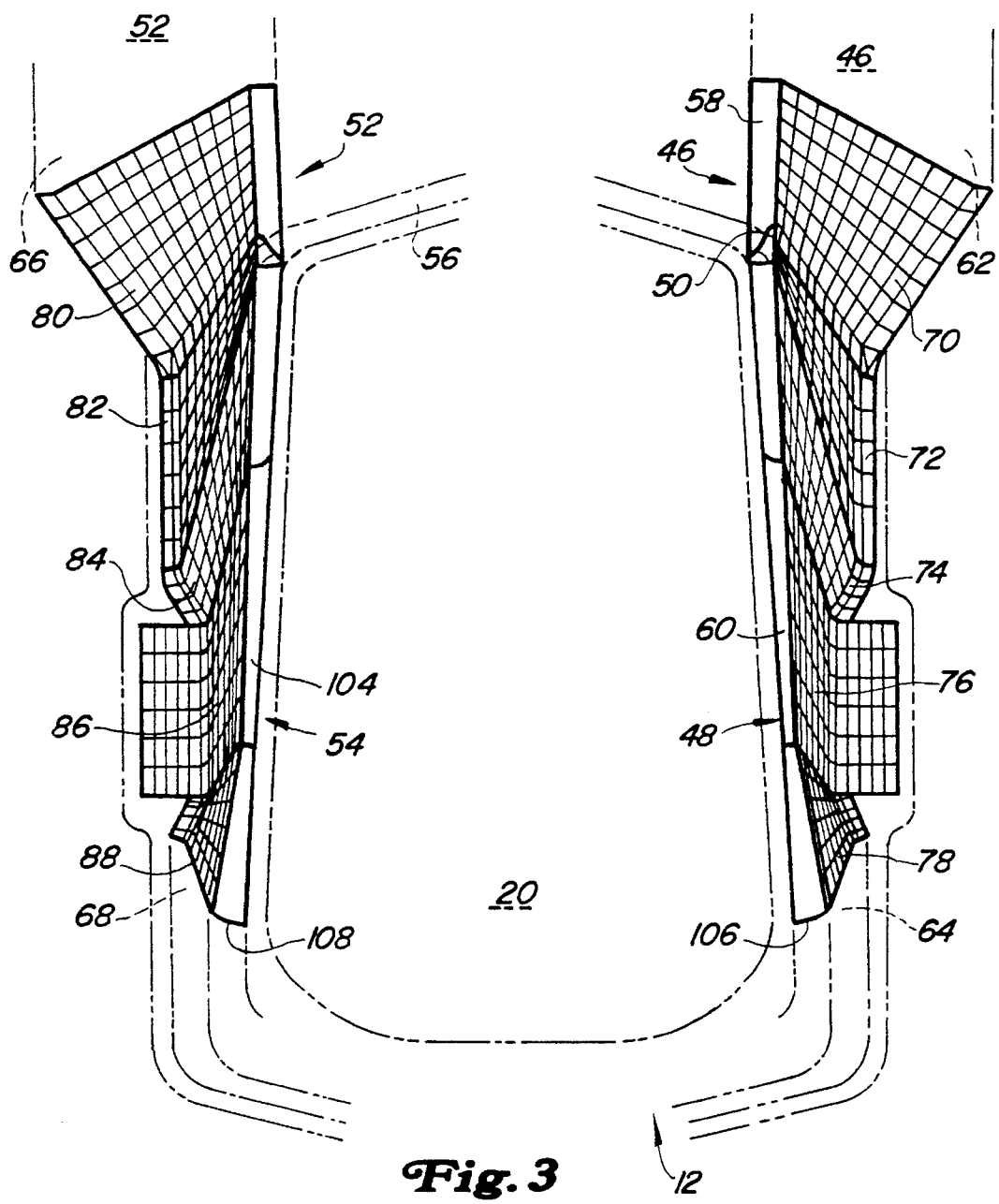
FIG. 3 is a rear partial plan view of the chassis in an unloaded state, with the suspension means being illustrated as wire-mesh structures.

Looking next to FIGS. 3, and 4, there is illustrated the right and left sets of panels 70–78 and 80–88 from a plan view in FIG. 3 and an upper rear right perspective view in FIG. 4. The unloaded condition of the chassis 12 as shown in FIGS. 3 and 4, is also depicted in schematic form in FIGS. 3a and 4a. The upper portions of FIGS. 3a and 4a are intended to represent the front end 28 of the vehicle 10. As can be seen in FIGS. 3a and 4a, the vehicle condition is intended to be one of operating on flat and level ground with no significant torsional or bending loads being transferred into the chassis 12.

Figure 5A:
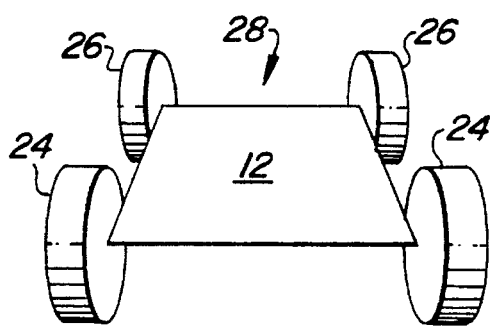
FIGS. 5a through 5d respectively, illustrate in schematic form the chassis when it is in its unloaded state (5a), when the right rear wheel is elevated with respect to the other wheels (5b), when the left front wheel is elevated with respect to the other wheels (5c) and when the left rear wheel is elevated with respect to the other wheels due to a rise in the terrain (5d).
Figure 5B:
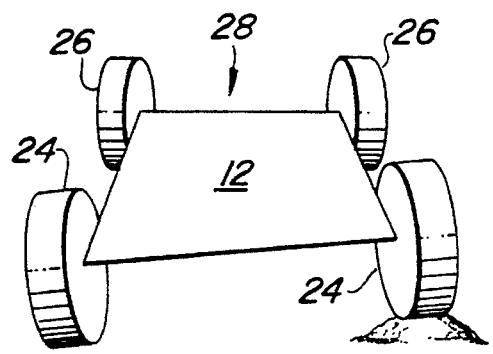
Figure 5C:
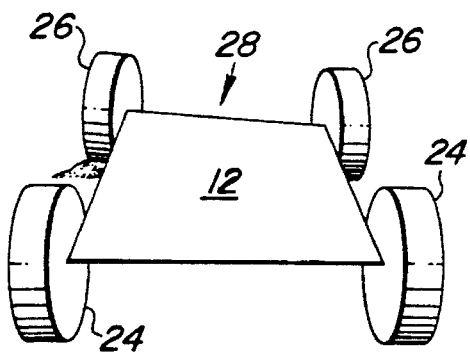
Figure 5D:
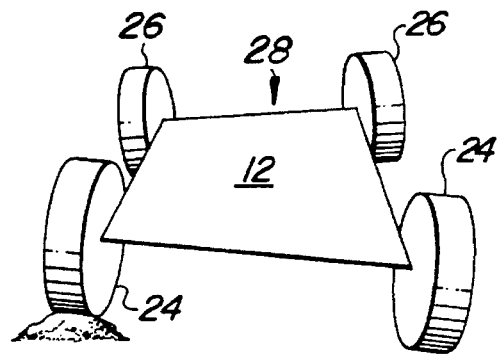

To depict the effects of torsional and bending loads on the chassis 12 as one wheel or another encounters uneven terrain FIGS. 5a, 5b, 5c and 5d have been provided. FIG. 5a illustrates the unloaded condition of the chassis 12 while FIG. 5b illustrates a situation wherein an obstacle or elevation is encountered by the right rear wheel 24. FIG. 5c illustrates a condition where the left front wheel 26 rises up as though it were passing over an obstacle. FIG. 5d illustrates the condition where a obstacle is encountered by the left rear wheel 24. Obviously, the conditions illustrated in FIGS. 5b, 5c, and 5d would result in bending and torsional loads being encountered by the chassis 12.

Figure 7:
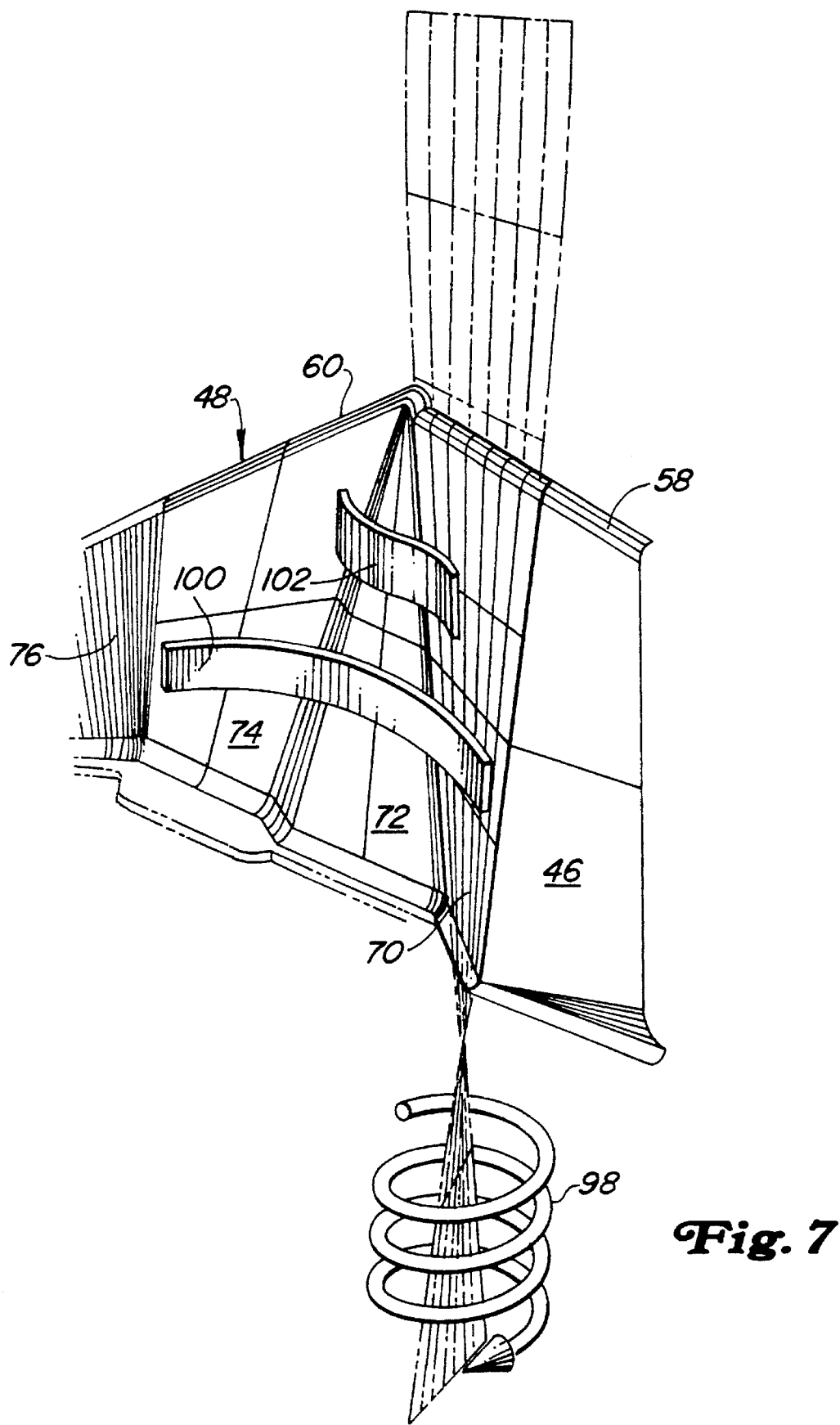
FIG. 7 illustrates five flexible panels between two rigid chassis members with leaf and coil springs superimposed to illustrate that the flexible panels can accommodate torsional as well as bending loads.

Looking now to FIG. 7, there is illustrated an enlarged partial perspective view of the right side of the chassis and the preferred embodiment which utilizes five flexible panels 70, 72, 74, 76 and 78 between the first and second rigid members 46 and 48. In schematic form, a coil spring 98 represents the ability of the first flexible member 70 and its twisted ribbon-like configuration to accommodate, transfer and resist torsional loads. Schematically illustrating the ability of the flexible panels 70, 72, 74, 76 and 78 to work together as a hinge or flat spring is the leaf spring 100 which extends across the width of the five panels 70, 72, 74, 76 and 78. Similarly, any two of the panels could work together as a "C"-shaped leaf spring 102, or three of the panels together could work together as would an "S" type leaf spring 102 to absorb bending forces encountered between the first and second rigid members 46 and 48.

Figure 8A:
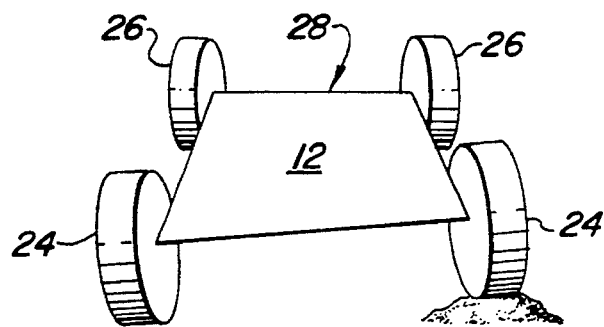
FIG. 8a is intended to illustrate schematically the condition of the chassis as the right rear wheel raises to pass over an obstacle.
Figure 8:
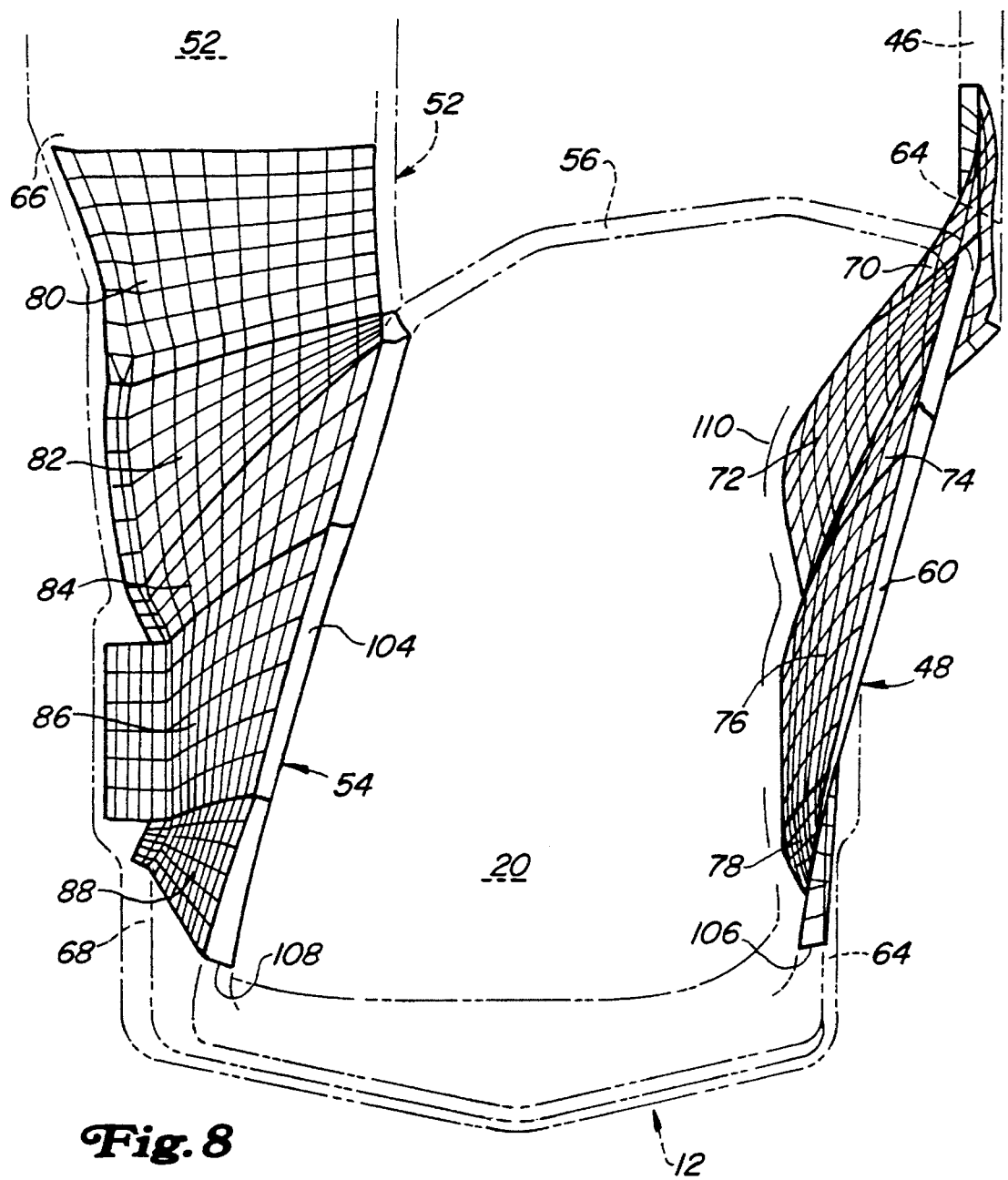
FIG. 8 is a plan view of the chassis suspension means in a flexed condition, as would occur when the right rear wheel would raise to pass over an obstacle.

Looking to FIGS. 8, 8a, 9 and 9a, there is illustrated the condition of the flexible members on each side of the chassis when it encounters bending and torsional forces as the right rear wheel 24 passes over an obstacle (see FIG. 5b). FIG. 8 illustrates a plan or top view of the flexible members 70–88 while FIG. 9 illustrates a right rear elevational view of the condition of those members. As can be seen in FIGS. 8 and 9, the sets of flexible members 70–78 and 80–88 are capable of sustaining substantial flexing or distortion to accommodate, transfer and dissipate the forces transferred between the first and second rigid members 46 and 48 and third and fourth rigid members 52, 54.

A comparison of the flexible panels in FIG. 3, the unloaded state, and FIG. 8, a loaded state, best illustrate the type and extent of bending and twisting the panels can accommodate as one wheel 84 moves in response to a change in ground conditions. As is apparent, the ribs or edges 60, 104 of the second and fourth rigid members 48 and 54 are pivoted about their rearward ends 106 and 108, remaining essentially parallel as the bottom of the right rear side of the chassis 12 is raised. This portion of the chassis remains generally inflexible since it is tied into the rigid engine-transaxle module. The first rigid member 46, which is joined to the essentially rigid front 28 of the chassis 12 as well as to the left side of the chassis through the fifth rigid member 56, flexes very little, thereby causing the flexible panels 70, 72, 74, 76 and 78 that extend between the first and second rigid members 46 and 48 to buckle or twist in the manner illustrated in FIG. 8. Meanwhile, the left set of flexible panels 80, 82, 84, 86 and 88 are caused to bend over and twist as illustrated in FIG. 8.

Looking now between FIGS. 3 and 8 to see how each of the five panels on the right half of the chassis react to the chassis loading depicted in FIG. 8a, we see that the first flexible member 70 not only bends outwardly and over, but also twists counterclockwise at its top portion as it absorbs both bending and torsional forces. The second flexible member 72, which is coupled to the first flexible member 70 and is essentially flat, bends outwardly at its top with very little twisting. The third flexible member 74 essentially bends outwardly at its top as would a flat spring or a "C" shaped spring member. The fourth flexible member 76 bends at its top towards the outside of the vehicle 10 with its forward edge bending outwardly to a greater extent as it also experiences clockwise twisting. The rear or fifth flexible panel 78 bends outwardly, more so at its front edge as it is twisted clockwise to absorb torsionell forces transferred to it by the second rigid member 48. In summary, when the right side of the chassis reacts to the loading depicted in FIG. 8a, it moves between the static condition of FIG. 3 and the loaded condition of FIG. 8 with the first panel 70 being both bent and twisted, the second 72 being bent and to a limited extent twisted, the third 74 being primarily bent, the fourth 76 being bent with some twisting and the fifth 78 having encountered substantial twisting and bending.

Looking now to the bending experienced by the group of flexible panels 70, 72, 74, 76 and 78, as they react to the chassis loading depicted in FIG. 8a, it is seen that all five bend and hinge as would a flat spring. The bending effect between them is depicted by the dotted line 110 and follows a combination of "C" and "S" bends. Further, the first, third, fourth and fifth panels 70, 72, 74, 76 and 78 experience noticeable twisting as they absorb torsional forces.

On the opposite or left side of the chassis 12, the other five flexible panels 80, 82, 84, 86 and 88 have also experienced flexing or deformation as the forward end of the fourth rigid member 54 is moved inwardly. As is also seen with the wire-form depiction, the first, third, fourth and fifth panels 80, 82, 84, 86 and 88 have experienced significant bending and twisting as they absorb the bending and torsional forces encountered by the chassis 12.

In reviewing the change in the configuration of the left set of panels 80, 82, 84, 86 and 88 between the conditions depicted in FIGS. 3 and 8, it is seen that the left first panel 80 both bends and twists clockwise. The left second 82 panel bends inwardly while the left third, fourth, and fifth panels 84, 86 and 88 bend inwardly and twist clockwise.

Further interconnecting the first and second rigid members 46 and 48 is the fifth rigid member 56 that extends across the center and mid-portion of the chassis 12. This rigid member 56 joins not only the first and second rigid members 46 and 48 but also interconnects the third and fourth rigid members 52 and 54. Thus, the fifth rigid member 56 serves to tie together the two sides of the chassis.

From the foregoing explanation, it can be seen that as the front or rear wheels encounter changes in terrain, the chassis will experience bending and torsional forces and the flexible panels between the rigid members will bend and twist to absorb, transfer and accommodate them. Further, the flexible panels serve as a suspension system to soften the ride as the loadings are encountered and absorbed throughout the chassis 12.

Figure 6:
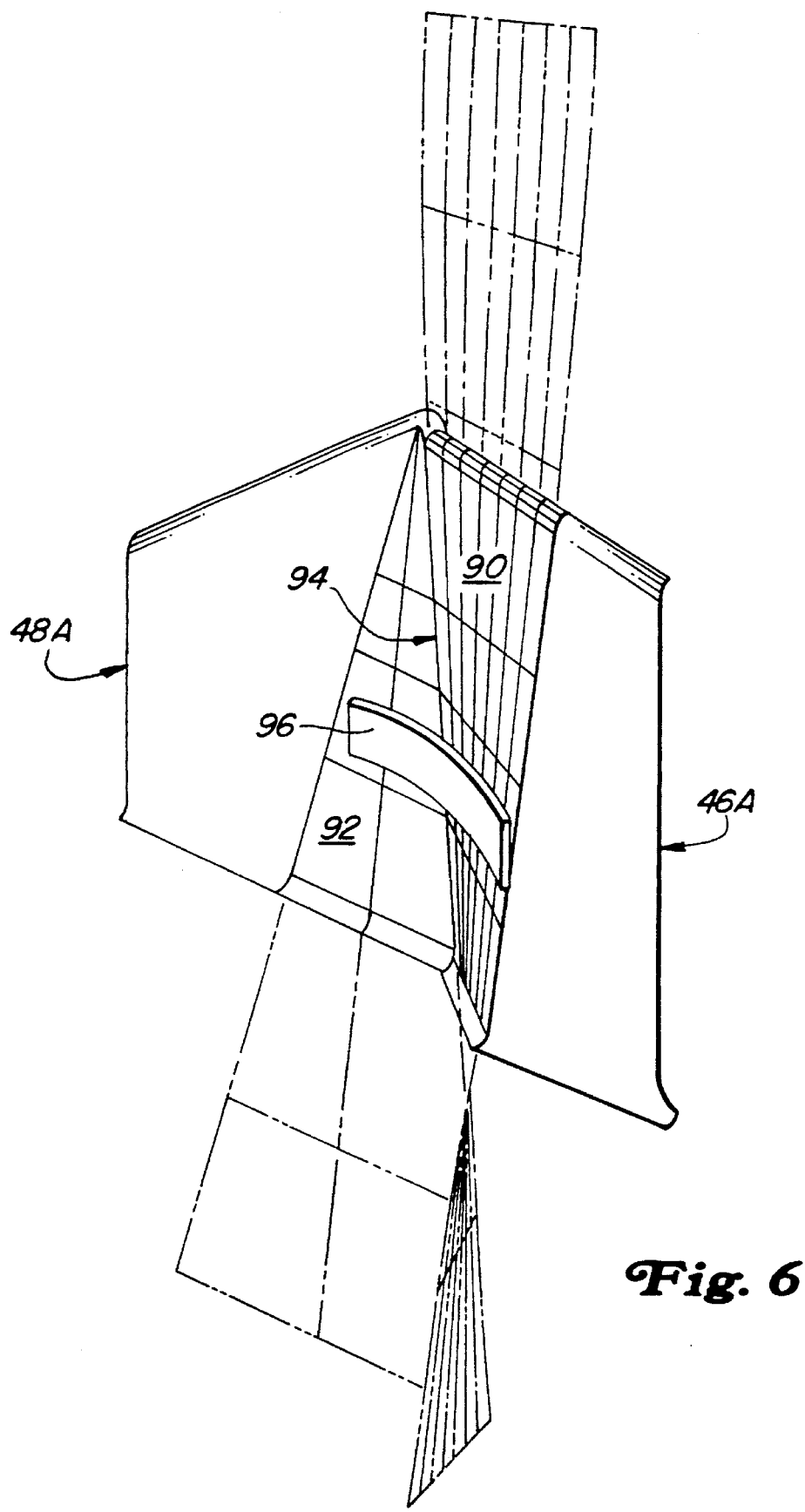
FIG. 6 is an enlarged partial view of a two panel suspension or hinge means provided between two rigid members of the chassis with a leaf spring superimposed to illustrate one suspension characteristic of the two flexible panels.

Looking now to FIG. 6, there is illustrated an embodiment wherein only two flexible panels 90 and 92 are provided between the first and second generally rigid members 46a and 48a. One panel could alternatively be provided if so desired. As schematically illustrated in FIG. 6, the flexible panels 90 and 92 are joined at a vertical edge 94 along which they are able to flex as a hinge. Additionally, they are able to flex together along and throughout their fore-and-aft extending dimensions. When flexing together in this manner, they work as would a flat leaf spring (schematically depicted by the leaf spring 96) to absorb bending forces that are transferred between the first and second rigid members 46a and 48a.

While it is expected that the use of flexible panels between generally rigid members will be of substantial value in the vehicle chassis, the invention could also be utilized for vehicle chassis components such as an operator's cab structure. The cab could utilize flexible members between it and the chassis frame to provide a suspension system for the cab.

The cross-sectional thickness of the chassis in the preferred embodiment, including all flexible and generally rigid members is four millimeters. To provide rigid and flexible characteristics in designated portions of the chassis the use of geometric shaping was utilized. The generally rigid characteristic has been provided to selected areas of the chassis by configuring them in "V" shapes such as in the seating area, see FIG. 10. Rolled over edges such as found at 58, 42, 56, 104, and 48 also provide strength to their respective portions of the chassis. Further, three sided configurations such as are found in FIG. 2 at 112, 114, 116 and 118 have been used to provide the generally rigid characteristic to designated portions of the chassis.

The flexible characteristic has been provided to designated portions of the four millimeter chassis through configuring those panels as generally flat members. Some twist has been provided in the generally flat panels of the preferred embodiment to better accommodate, control and dissipate torsional loadings encountered by the chassis.

Alternatively, rigid and flexible characteristics could be provided through varying the cross-sectional thickness of the members and panels. Generally rigid members could be attained by selecting thicknesses sufficient to provide the desired sturdiness or rigidity. Variations in the thickness could be incorporated into a member as appropriate to provide the rigidity or flexibility ,desired in that member or area of the chassis. Such thicknesses could be greater or less than that of the preferred embodiment's four millimeters, depending on other design choices relating to the polymer being used, fiber material chosen and fiber layering employed, if any.

Figure 11:
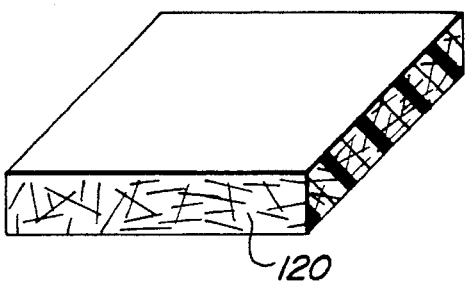
FIG. 11 is a schematic: of a fiber reinforced plastic composite with randomly placed fibers.

Another design choice available for providing rigid and flexible characteristics to designated portions of the chassis would relate to the fiber materials, fiber sizes and/or combinations of fibers used in the chassis. For example, glass fibers could be used in chassis sections requiring some flexibility while carbon or aramid fibers could be used in those sections which demand greater rigidity. These fibers 120 could be introduced into the polymer randomly, as they are in the preferred embodiment, (see FIG. 11). Combinations of different fiber types, lengths, widths and sizes as well as distribution of these fibers within the polymer could also be utilized to impart flexibility or rigidity consistent with the desired design goals for a particular chassis section. Further, fibers displaying either isotropic or anisotropic characteristics could be used where appropriate.

Figure 12:
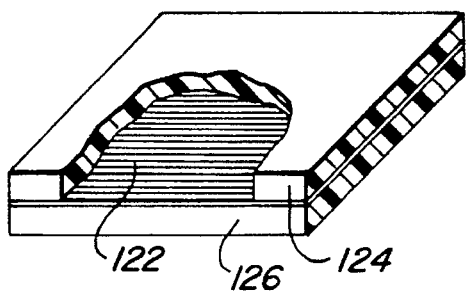
FIG. 12 is a schematic of a fiber reinforced plastic composite with a fiber mat.
Figure 13:
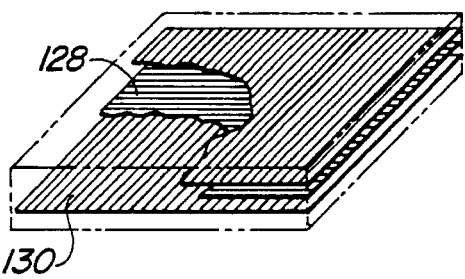
FIG. 13 is a schematic of a fiber reinforced plastic composite with non-aligned fiber mats.
Figure 14:
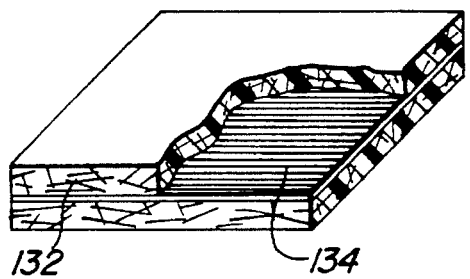
FIG. 14 is a schematic of a fiber reinforced plastic composite with a fiber mat and randomly placed fibers.

As illustrated in FIG. 12, woven fiber mats 122 could be laminated between the polymer layers 124 and 126 in specified sections of the chassis to impart greater rigidity (see FIG. 12). Either the same fiber could be layered or different fibers 128 and 130 could be layered in aligned or non-aligned orientations (see FIG. 13) in the polymer to achieve desired flexibility and/or rigidity goals for those sections. If desired, randomly introduced fibers 132 could be combined with mats or laminations 134 of material (see FIG. 14).

Further, various polymer compositions or combinations could be used that would provide varying degrees of flexibility or rigidity. For example, epoxy matrix resins could be used in chassis having portions requiring primarily rigid sections, whereas polyester polymers could be used in chassis having flexible panel sections. Alternatively, compatible polymers could be blended or combined to achieve desired polymer matrix characteristics (hybridized) consistent with rigid and/or flexible design goals.

The preferred embodiment utilizes 60 percent (by weight) one inch glass fibers and a compression moldable hybrid vinyl ester-based thermosetting sheet molding compound. Quantum composite INL's QC-8800 polymer formulation has been found satisfactory for this use. The glass fibers have been randomly placed within the thermosetting polymer and a four millimeter thickness has been used throughout the whole chassis to provide isotropic or similar material property characteristics throughout the chassis. While a compression molding manufacturing method has been utilized with the thermoset polymer, the chassis with these glass and thermoset polymer combinations could be manufactured by a liquid composite molding process such as resin transfer molding (RTM) or structural reaction injection molding (SRIM) with the appropriate glass preforms. Similarly, a hand lay-up manufacturing technique could be used.

Alternatively, a thermoplastic such as Dow's Isoplast 101 that contains 40 percent half inch glass fiber could be used in an injection molding procedure to produce the chassis configuration illustrated in FIG. 2. A compression moldable glass mat thermoplastic composite such as General Electric's Azdel or Composite Plastics, Inc.'s PP-6-40-0.5AP could be used with the compression molding manufacturing technique.

In summary, a single piece chassis has been provided that incorporates both rigid and flexible sections enabling it to resist, transfer and dissipate both bending and torsional loads, thereby reducing the need for a separate suspension system. While generally rigid and flexible chassis sections have been provided through geometric shaping of parts in a chassis with a uniform cross-sectional thickness, the rigid and flexible characteristics could be designed through variations in cross-sectional thickness, alternate fiber selections and/or combinations, and polymer selections.

While the preferred embodiment utilizes glass fibers and thermoset polymer in a compression molding process, other fibers such as carbon, aramid and/or glass combinations could be used with either thermoplastic or thermoset polymers. When thermoplastic is used, then the chassis could be produced with either injection or compression molding techniques. When thermoset polymers are used, the chassis could be produced either through compression, liquid composite molding or hand lay-up processes.

With the present invention, there has been provided a single piece plastic chassis design which incorporates suspension characteristics and permits the use of a wide range of fiber reinforcement materials and polymers. The design further permits the use of either thermoplastic or thermoset polymers that enables it to be produced through a variety of mass-production manufacturing techniques, such as compression molding, liquid composite molding, injection molding or hand lay-ups. Accordingly, there are provided choices for both material usage and manufacturing techniques that make available to the chassis designer a broad range of design capabilities with opportunity for cost effective mass-manufacture.

We claim:

1. A vehicle chassis adapted to carry a power means, steering and drive wheels and a steering means, said chassis comprised of a plastic composite material reinforced with flexible elements, said material including first and second spaced apart members formed on one side portion of said chassis, each of which have a geometrically shaped section including a turned-over portion that serves to make each member generally inflexible, said inflexible members being interconnected by a member formed in said material that is relatively flexible and adapted to accommodate torsional or bending forces encountered by the chassis.

2. The invention defined in claim 1 wherein the flexible member is adapted to twist and bend as the generally inflexible members encounter torsional and bending forces.

3. The invention defined in claim 1 wherein the flexible member includes two flexible segments which are elongated and joined together along a common edge.

4. The invention defined in claim 3 wherein one flexible segment includes an elongated edge which is integrally joined to an edge carried on one inflexible member.

5. The invention defined in claim 1 wherein the chassis material is isotropic.

6. The invention defined in claim 1 wherein the material thickness throughout the chassis is substantially uniform.

7. The invention defined in claim 1 wherein each turned over portion is in the form of a "v".

8. The invention defined in claim 1 wherein the turn over portion of one inflexible member is a bend that includes an acute angle.

9. The invention defined in claim 1 wherein three generally planar panels are joined together to form a generally c-shaped section in one inflexible member.

10. The invention defined in claim 1 wherein the flexible member is elongated and twisted about an axis which extends through the elongated dimension.

11. The invention defined in claim 1 wherein there are a plurality of flexible members adjacent to one another and joined together, with the first and second inflexible members being interconnected by the flexible members.

12. The invention defined in claim 1 wherein the chassis has left and right sides with each side including first and second inflexible, spaced apart members which are interconnected by a flexible member.

13. The invention defined in claim 12 wherein an operator station is provided between the first and second sides.

14. The invention defined in claim 1 wherein the flexible elements reinforcement provided in said material is generally uniformly distributed throughout the chassis.

15. The invention defined in claim 14 wherein the reinforcement includes a woven fiber mat.

16. The invention defined in claim 15 wherein there are at least two fiber mats included in the material, with the orientation of the mats relative to one another being non-aligned.

17. The invention defined in claim 1 wherein the reinforcements include glass fibers.

18. The invention defined in claim 17 wherein the fibers are randomly placed throughout the chassis material.

19. The invention defined in claim 1 wherein the chassis is comprised of a thin-walled plastic composite material.

20. The invention defined in claim 1 wherein the cross-sectional thickness of the plastic composite material is substantially uniform throughout the chassis.

21. A vehicle chassis that is adapted to carry a power means, steering and drive wheels and a steering means, the chassis being composed of a plastic composite material reinforced with flexible elements, said material including first and second spaced apart members formed on one side portion of said chassis, each of which have a geometrically shaped section including a turned-over portion that serves to make each member generally inflexible, the members being interconnected by a hinge means formed in said material, which include first and second relatively flexible members coupled together and adapted to permit the first inflexible member to move relative to the second inflexible member.

22. The invention defined in claim 21 wherein the hinge means includes a third flexible member coupled with the first flexible member.

23. The invention defined in claim 22 wherein the hinge means includes a fourth flexible member coupled with the first flexible member.

24. The invention defined in claim 23 wherein the hinge means includes a fifth flexible member coupled with the first flexible member.

25. The invention defined in claim 21 wherein at least one flexible member is elongated and twisted about an axis extending through its elongated dimension.

26. The invention defined in claim 21 wherein the reinforcements include glass fibers.

27. The invention defined in claim 21 wherein the reinforcement provided in said material is generally uniformly distributed throughout the chassis.

28. The invention defined in claim 21 wherein the reinforcement includes a woven fiber mat.

29. The invention defined in claim 28 wherein there are at least two fiber mats included in the material, with the orientation of the mats relative to one another being non-aligned.

30. The invention defined in claim 26 wherein the fibers are randomly placed throughout the chassis material.

31. The invention defined in claim 21 wherein the first and second flexible members flex together between the first and second inflexible members to function as a leaf spring means.

32. The invention defined in claim 21 wherein a third flexible member is coupled with the first and second flexible members and together they can flex and function as an s-spring between the inflexible members.

33. The invention defined in claim 21 wherein the chassis material is isotropic.

34. The invention defined in claim 21 wherein the material thickness throughout the chassis is substantially uniform.

35. The invention defined in claim 21 wherein the turned over portion is in the form of a "v".

36. The invention defined in claim 21 wherein the turned over portion of one inflexible member is a bend that includes an acute angle.

37. The invention defined in claim 21 wherein three generally planar panels are joined together to form a generally c-shaped section in one inflexible member.

38. The invention defined in claim 21 wherein the flexible member is elongated and twisted about an axis which extends through one elongated dimension.

39. The invention defined in claim 21 wherein there are a plurality of flexible members adjacent to one another and joined together, with the first and second inflexible members being interconnected by the flexible members.

40. The invention defined in claim 21 wherein the chassis has left and right sides with each side including first and second inflexible, spaced apart members which are interconnected by a flexible member.

41. The invention defined in claim 40 wherein an operator station is provided between the first and second sides.

42. The invention defined in claim 21 wherein the chassis is composed of a thin-walled plastic composite material.

43. The invention defined in claim 21 wherein the cross-sectional thickness of the plastic composite material is substantially uniform throughout the chassis.

44. A vehicle chassis component comprised of a composite plastic material reinforced with flexible elements, said material including first and second members formed on a side portion, each having a geometrically shaped section including a turned-over portion that serves to make each member generally rigid, said first rigid member interconnected to the second rigid member by a relatively flexible member formed in said material and adapted to twist or bend as torsional and bending forces are encountered by either or both of the rigid members.

45. The invention defined in claim 44 wherein the material of the chassis component is isotropic.

46. The invention defined in claim 44 wherein the material thickness throughout the chassis component is substantially uniform.

47. The invention defined in claim 44 wherein the turned over portion is in the form of a "v".

48. The invention defined in claim 44 wherein the turned over portion of one inflexible member is a bend that includes an acute angle.

49. The invention defined in claim 44 wherein the flexible member is elongated and twisted about an axis which extends through the elongated dimension.

50. The invention defined in claim 44 wherein there are a plurality of flexible members adjacent to one another and joined together, with the first and second inflexible members being interconnected by the flexible members.

51. The invention defined in claim 44 wherein the reinforcement provided in said material is generally uniformly distributed throughout the chassis.

52. The invention defined in claim 44 wherein the reinforcement includes a woven fiber mat.

53. The invention defined in claim 52 wherein there are at least two fiber mats included in the material, with the orientation of the mats relative to one another being non-aligned.

54. The invention defined in claim 44 wherein the reinforcement includes a plurality of glass fibers.

55. The invention defined in claim 54 wherein the fibers are randomly placed throughout the component material.

56. The invention defined in claim 44 wherein the chassis component is composed of a thin-walled plastic composite.

57. The invention defined in claim 44 wherein the cross-sectional thickness of the plastic composite material is substantially uniform throughout the component.

58. The invention defined in claim 44 wherein the composite material is of generally uniform composition.

59. The invention defined in claim 58 wherein the flexible elements include glass fibers which are randomly placed throughout the composite material.

60. The invention defined in claim 59 wherein the fibers are approximately one inch in length.

61. The invention defined in claim 58 wherein the cross-sectional thickness of the composite material is generally uniform throughout the chassis.

62. A vehicle chassis that is adapted to carry a power means, steering and drive wheels and a steering means, the chassis being comprised of plastic composite material reinforced with flexible elements, said material including first and second spaced apart members formed on one side portion of said chassis, each member including a geometrically shaped section including a turned-over portion that serves to make each member generally inflexible, the members being interconnected by a relatively flexible member formed in said material and adapted to serve as a leaf spring means between the inflexible members and absorb torsional or bending forces encountered by them.

63. The invention defined in claim 62 wherein a second flexible member is coupled with one inflexible member and together the two flexible members serve as a leaf-spring means to absorb bending loads encountered by the inflexible members.

64. The invention defined in claim 63 wherein the two flexible members are adapted to individually flex inwardly or outwardly as the first and second inflexible members encounter bending loads.

65. The invention defined in claim 63 wherein a third flexible member is coupled with the other two flexible members.

66. The invention defined in claim 65 wherein a fourth flexible member is coupled with the other three flexible members.

67. The invention defined in claim 66 wherein a fifth flexible member is coupled with the other four flexible members.

68. The invention defined in claim 62 wherein one of the flexible members includes a portion having a generally flat and elongated web which is twisted throughout its length to accommodate torsional loadings transferred to it from the inflexible members.

69. The invention defined in claim 62 wherein the chassis material is isotropic.

70. The invention defined in claim 62 wherein the material thickness throughout the chassis is substantially uniform.

71. The invention defined in claim 62 wherein the reinforcement provided in said material is generally uniformly distributed throughout the chassis.

72. The invention defined in claim 62 wherein the reinforcement includes a woven fiber mat.

73. The invention defined in claim 62 wherein the reinforcements include glass fibers.

74. The invention defined in claim 73 wherein the fibers are randomly placed throughout the chassis material.

75. The invention defined in claim 62 wherein the chassis is comprised of a thin-walled plastic composite material.

76. The invention defined in claim 62 wherein the cross-sectional thickness of the plastic composite material is substantially uniform throughout the chassis.

77. For use in a vehicle adapted to carry a power means, steering and drive wheels and a steering means, a chassis comprised of a plastic composite material reinforced with flexible elements, said material including first and second spaced apart members formed on one side portion of said chassis, each member including a geometrically shaped section including a turned-over portion that serves to make each member generally inflexible, suspension means incorporated into the chassis and adapted to accommodate bending or torsional forces encountered by the two inflexible members, the suspension means including first and second relatively flexible members formed in the material and interconnecting the first and second inflexible members.

78. The invention defined in claim 77 wherein the chassis includes forward and rearward portions with one of the inflexible rigid members being provided near each portion.

79. The invention defined in claim 77 wherein the chassis further includes third and fourth inflexible members which are also interconnected by a second suspension means that includes third and fourth flexible members adapted to accommodate bending and torsional loads.

80. The invention defined in claim 79 wherein the first, second, third and fourth inflexible members are adapted to provide a support for a vehicle operator.

81. The invention defined in claim 79 wherein the chassis includes forward and rearward portions and the first and third inflexible members are carried on the chassis closer to the forward portion while the second and fourth inflexible members are carried nearer to the rearward portion of the chassis.

82. The invention defined in claim 81 wherein the chassis further includes a fifth inflexible member interconnecting the first and third inflexible members.

83. The invention defined in claim 81 wherein flexible members interconnect the first and second inflexible members to accommodate bending and torsional loads encountered by them.

84. The invention defined in claim 81 wherein portions of the first and third inflexible members are v-shaped.

85. The invention defined in claim 84 wherein the chassis further includes a fifth inflexible member interconnecting the first and third generally inflexible members.

86. The invention defined in claim 79 wherein the chassis further includes a fifth inflexible member interconnecting the first and third generally inflexible members.

87. The invention defined in claim 79 wherein the turned-over portions of two of the inflexible members are v-shaped.

88. The invention defined in claim 77 wherein at least one of the inflexible members is generally v-shaped.

89. The invention defined in claim 72 wherein the reinforcements include glass fibers.

90. The invention defined in claim 89 wherein the fibers are randomly placed throughout the chassis material.

91. The invention defined in claim 77 wherein the chassis material is isotropic.

92. The invention defined in claim 77 wherein the material thickness throughout the chassis is substantially uniform.

93. The invention defined in claim 77 wherein one flexible member is elongated and twisted about an axis which extends through the elongated dimension.

94. The invention defined in claim 77 wherein the reinforcement provided in said material is generally uniformly distributed throughout the chassis.

95. The invention defined in claim 77 wherein the reinforcement includes a woven fiber mat.

96. The invention defined in claim 95 wherein there are at least two fiber mats included in the material, with the orientation of the mats relative to one another being non-aligned.

97. The invention defined in claim 77 wherein the chassis is comprised of a thin-walled plastic composite material.

98. The invention defined in claim 77 wherein the cross-sectional thickness of the plastic composite material is substantially uniform throughout the chassis.

99. A vehicle chassis that is adapted to carry a power means, steering and drive wheels and a steering means, said chassis comprised of reinforced plastic composite material and including first and second elongated side members, said side members including two generally rigid members joined with two flexible panels adapted to accommodate torsional or bending loads encountered by the chassis.

100. The invention defined in claim 99 wherein the composite is reinforced with glass fibers.

101. The invention defined in claim 99 wherein the rigid members have a geometrically shaped section including a turned-over portion formed therein.

102. The invention defined in claim 99 wherein the composite material is reinforced with a fiber mat.

103. The invention defined in claim 72 wherein there are at least two fiber mats included in the material, with the orientation of the mats relative to one another being non-aligned.

* * * * *

UNITED STATES PATENT AND TRADEMARK OFFICE
CERTIFICATE OF CORRECTION

PATENT NO. : 5,558,368

DATED : 24 September 1996

INVENTOR(S) : John R. Cerny et al.

It is certified that error appears in the above-indentified patent and that said Letters Patent is hereby corrected as shown below:

Claim 14, Column 9, line 10, delete "elements" and insert
- - element - -.

Claim 78, Column 12, line 25, delete "rigid".

Claim 88, Column 12, line 58, delete "is" and insert - - includes a - -
and after "v-shaped" insert - - section - -.

Signed and Sealed this

Third Day of March, 1998

*Attest:*

BRUCE LEHMAN

*Attesting Officer*     Commissioner of Patents and Trademarks